(12) United States Patent
Zimmerman

(10) Patent No.: US 10,150,051 B2
(45) Date of Patent: Dec. 11, 2018

(54) MASS TRANSFER PROCESSES WITH LIMITED SENSIBLE HEAT EXCHANGE

(71) Applicant: PERLEMAX LIMITED, Yorkshire (GB)

(72) Inventor: William Bauer Jay Zimmerman, Yorkshire (GB)

(73) Assignee: PERLEMAX LIMITED, Yorkshire (GB)

(*) Notice: Subject to any disclaimer, the term of this patent is extended or adjusted under 35 U.S.C. 154(b) by 616 days.

(21) Appl. No.: 14/443,544

(22) PCT Filed: Nov. 22, 2013

(86) PCT No.: PCT/EP2013/074526
§ 371 (c)(1),
(2) Date: May 18, 2015

(87) PCT Pub. No.: WO2014/079993
PCT Pub. Date: May 30, 2014

(65) Prior Publication Data
US 2015/0336028 A1  Nov. 26, 2015

(30) Foreign Application Priority Data

Nov. 23, 2012  (GB) .................................. 1221134.8

(51) Int. Cl.
*B01D 3/16* (2006.01)
*B01D 53/18* (2006.01)
(Continued)

(52) U.S. Cl.
CPC ................. *B01D 3/16* (2013.01); *B01D 1/14* (2013.01); *B01D 17/0205* (2013.01);
(Continued)

(58) Field of Classification Search
CPC ............. B01D 3/16–3/20; B01D 17/02; B01D 17/0202; B01D 17/0205; B01D 19/001;
(Continued)

(56) References Cited

U.S. PATENT DOCUMENTS 4,499,035 A     2/1985 Kirkpatrick et al.
4,559,109 A *  12/1985 Lee .......................... B01D 3/40
                                                    203/19
(Continued)

FOREIGN PATENT DOCUMENTS

CN       102728297 A    10/2012
JP       2007-054722 A   3/2007
(Continued)

OTHER PUBLICATIONS

Guy, C., et al. "Heat and Mass Transfer between Bubbles and a Liquid." The Canadian Journal of Chemical Engineering, Wiley Subscription Services, Inc., A Wiley Company, Mar. 27, 2009, onlinelibrary.wiley.com/doi/10.1002/cjce.5450700109/pdf.*
(Continued)

*Primary Examiner* — Bobby Ramdhanie
*Assistant Examiner* — Briana M Obenhuber
(74) *Attorney, Agent, or Firm* — Leason Ellis LLP

(57) ABSTRACT

A process of mass transfer is described which utilizes latent heat transfer with little or sensible heat transfer. In a preferred process microbubbles are used under certain conditions of contact with a liquid phase to ensure highly effective mass transfer between a gaseous and liquid phase with significantly less than expected or little or no sensible heat transfer. The present invention in part provides a means by which the known state of a cold liquid of varying depths can be changed using a hot gas injected via a micro bubble inducing internal mixing without allowing the resultant mixture to reach equilibrium thereby ensuring the transfer
(Continued)

Equipment Set-Up process becomes continuous. Thus a process is described wherein at least one gaseous phase is contacted with at least one liquid phase such that the heat ratio of the system (AA) is maintained at an a value of greater than 0.5, and the mass transfer is effected by passing a gaseous phase comprising microbubbles through a liquid phase of thickness no more than 10 cm.

25 Claims, 5 Drawing Sheets

(51) Int. Cl.
  *B01D 1/14* (2006.01)
  *B01D 53/14* (2006.01)
  *B01D 17/02* (2006.01)
  *B01D 19/00* (2006.01)
(52) U.S. Cl.
  CPC ......... *B01D 19/0005* (2013.01); *B01D 53/14* (2013.01); *B01D 53/18* (2013.01)
(58) Field of Classification Search
  CPC ............ B01D 19/0021; B01D 19/0042; C10L 2290/54; C10L 2290/541; C10L 2290/542; C10L 2290/543; C10L 2290/544; C10L 2290/545
  See application file for complete search history.

(56) References Cited

U.S. PATENT DOCUMENTS

| | | | |
|---|---|---|---|
| 5,030,362 | A | 7/1991 | Da Silva et al. |
| 5,202,032 | A | 4/1993 | Shoemaker |
| 5,211,856 | A | 5/1993 | Shen et al. |
| 5,422,044 | A | 6/1995 | Cheng |
| 9,675,903 | B2 * | 6/2017 | Somlyai ............. B01D 19/0005 |
| 2006/0016215 | A1 | 1/2006 | Tonkovich et al. |
| 2006/0102007 | A1 | 5/2006 | Martin |
| 2010/0002534 | A1 * | 1/2010 | Zimmerman ....... B01F 3/04248 366/106 |
| 2010/0300869 | A1 | 12/2010 | Kretschmer et al. |
| 2013/0074694 | A1 * | 3/2013 | Govindan ............ B01D 5/0027 95/150 |

FOREIGN PATENT DOCUMENTS

WO  WO 2008/053174 A1  5/2008
WO  WO 2010/128360 A1  11/2010

OTHER PUBLICATIONS

International Preliminary Report on Patentability in corresponding PCT Application No. PCT/EP2013/07452, dated May 26, 2015.
International Search Report and Written Opinion in corresponding PCT Application No. PCT/EP2013/07452, dated Apr. 24, 2014.

* cited by examiner

Figure 1: Equipment Set-Up

US 10,150,051 B2

MASS TRANSFER PROCESSES WITH LIMITED SENSIBLE HEAT EXCHANGE

CROSS-REFERENCE TO RELATED PATENT APPLICATIONS

This application is a U.S. National Phase Application under 35 U.S.C. § 371 of International Patent Application No. PCT/EP2013/074526, filed Nov. 22, 2013, and claims priority to Great Britain Application No. 1221134.8, filed Nov. 23, 2012, all of which are incorporated by reference in their entireties. The International Application was published on May 30, 2014 as International Publication No. WO 2014/079993 A1.

FIELD OF INVENTION

The present invention is concerned with processes for mass transfer involving gaseous and liquid phases and in particular to such processes where there is limited sensible heat transfer.

BACKGROUND ART

There are a variety of processes in the art which utilize the contacting of gaseous and liquid phases. A common process involves the introduction of the gaseous phase in the form of bubbles which make contact with the liquid phase as they pass through that phase. This common process is used in a number of applications and for a number of purposes. A hot gas may be bubbled through a liquid to transfer heat from the gaseous phase to the liquid phase or the gas may be at a lower temperature to absorb heat from the liquid phase and into the gaseous phase.

There are conventional processes for the mass transfer of a material from the liquid to gaseous phase. Boiling, sparging and distillation.

There are three effects achieved by boiling: (i) provision of the latent heat of vaporization, (ii) raising the temperature of the liquid so that the temperature of the vapour that is in equilibrium rises, hence raising the saturation pressure of water vapor or the absolute humidity achievable, (iii) increasing the gas-liquid interfacial area so as to increase the rate of evaporation. So if the aim is vaporization, most of the applied heat is actually used to raise the water temperature, rather than to "pay" for the latent heat of vaporization and to raise the absolute level of humidity achievable. This is an unavoidable consequence of equilibrium.

When a hot bubble is injected into a cold liquid, there is a non-equilibrium driving force for both heat and mass transfer, but also, depending on the compositions of the phases, for phase change by evaporation or condensation, which is often referred to as a flash. Conventional distillation (batch or continuous columns and fractional distillation) heat the liquid in reboilers and pre-heat the liquid feed stream, so if there are microbubble clouds generated, they are hot bubbles in a hot liquid.

In addition to sensible heat transfer many processes involve mass transfer from one phase to the other or between both phases to each other. One such process of mass transfer is sparging. Typically with sparging a chemically inert gaseous phase is introduced to a liquid phase to remove a material such as a dissolved gas from the liquid e.g. removal of hydrogen or oxygen. In other variants that gas removes a low-boiling volatile component of the liquid phase. Sparging may be carried out in the absence of applied heat although in many examples either the gaseous or liquid phases or both may be heated prior to or during contact with each other. Another process uses the gaseous phase to introduce a material into the liquid phase. Often this is dissolution of a gas e.g. oxygen into the liquid phase. In some examples the totality of the introduced gas is dissolved in the liquid phase and in other variants the gas to be dissolved is in admixture with a carrier gas.

In other processes the gaseous and liquid phases contain materials for bi-molecular or other more complex reactions. The resulting bi-molecular reaction may occur mostly on the bulk gaseous phase of the bulk liquid phase with the resulting products either passing into the liquid phase or the gaseous phase or both phases. The resulting by products or waste may also pass into the liquid phase or the gaseous phase or both phases. In these reactions a catalyst for the reaction may be supplied through either or both phases.

Other processes result in bi-molecular reactions at the interface of the gaseous phase and the liquid phase and not in the bulk phase of either, where one component of the reaction is brought to this interface in the gas and the second is brought to this interface in the liquid. The resulting products either passing into the liquid phase or the gaseous phase or both phases. The resulting by products or waste may also pass into the liquid phase or the gaseous phase or both phases. In these interfacial reactions a catalyst for the reaction may be supplied through either or both phases.

In other processes a catalyst may be present in the gaseous or liquid phase and is transferred into the other phase to catalyse a reaction in that phase, with either products or waste materials being removed from that phase and into the other phase.

Microbubbles are known and have been utilised in a number of applications. Until recently, generating clouds of microbubbles was a relatively expensive proposition, with the smallest bubbles requiring high energy density from either the saturation-nucleation mechanism or Venturi effect. Due to the expense of processing with microbubbles, exploration of the acceleration effects of microbubbles for physicochemical processes are largely unstudied, particularly those that are combined effects.

For example in published international patent application WO2008/053174, there is described a method and apparatus for the generation of microbubbles. Various processes for gas dissolution or sparging and other applications are discussed.

In published U.S. Pat. No. 5,422,044, there is described a gas injection and heating device and method for the bubbling of a gas into a body of hot liquid to be interacted with the gas. The device comprises an elongate heat exchange gas container, designed to be immersed in the hot liquid to pre-heat the gas in situ by heat exchange with the liquid. Cold gas is supplied to the elongate gas container, circulated there through to become heated to the liquid temperature, and then released from a nozzle into the depth of the liquid in the form of small bubbles of hot gas having a large liquid interfacial mass transfer area.

In published U.S. Pat. No. 5,030,362 there is described a process for stripping liquid systems and a sparger system wherein Undesirable materials, such as unreacted raw materials and by-products, are stripped from liquid systems by delivering a compressed, inert gas through the pores of a sintered porous sparger element and into the liquid system in the form of very small gas micro bubbles.

In published U.S. Pat. No. 5,202,032 there is described a method of removing and recovering hydrocarbons from hydrocarbon/water mixtures in which the hydrocarbons are stripped from non-flowing hydrocarbon/water mixtures by a batch procedure by stripping with a stream of inert gas, such as air, introduced into the mixture under pressure, whilst contained in a tank and preferably heated. Preferably two tanks are used, the one being stripped whilst the other is filled.

In published United States Patent Application No. 2006/0102007, there is described a cold method of heated distillation by manipulating bubbles, and code distillate condensation. The continuous method introduces counter-current gas bubbles to a solution under vacuum at cold temperatures, using passive bubble manipulation. The approach accomplishes volatile evaporation at temperatures too low for thermal damage to occur, scrubs distilland mist from evaporated distillate, and condenses distillate by adding little or no heat. The method operates between freezing and ambient temperatures, but primarily near freezing, thus reducing energy consumption, and completely avoiding common thermal damage to delicate aroma, flavor, color, and nutritional distallate constituents that are characteristic of conventional aroma or essence extraction, food or drink concentrations, and chemical separation processes.

In published U.S. Pat. No. 5,211,856 there is described a method for low vacuum oil/water mixture liquid separation and an oil purification device for oil/water separation. Fully diffused purified gas is introduced into an oil/water mixture liquid in a low vacuum container, enabling the liquid to produce concentrated micro fine gas bubbles, enabling the liquid to be in a state of gas/liquid two-phase mixture. This greatly increases the surface area of the oil/water mixture liquid, speeding up the oil/water separation. This invention provides an oil/water separation rate ten times higher than that of the conventional method. This invention is not only suitable for the purification of new oil, but is adequate in the recovery, regeneration and purification of various water lubrication oils, hydraulic oils, and transformer oils.

In Japanese Laid Open Patent Application 2007-54722 (Hitachi Brand Technology Co. Ltd), there is described a liquid concentration method and apparatus in which concentration proceeds using evaporation from a liquid surface characterised by the provision of micro air bubbles to liquid in a flow channel and its subsequent heating, the evaporation of volatile components into the said micro air bubbles flowing in said channel, subsequent gas-liquid separation and, the liquid obtained from gas-liquid separation being the concentrated product to be collected.

Despite extensive research in the area of processes for mass transfer involving gaseous and liquid phases there are still areas that are problematic. In particular is that conundrum associated with mass transfer whilst seeking to avoid or limit heat transfer. The present state of the art is unable to address this problem. Under current understanding in order to secure adequate levels of mass transfer between a liquid and gaseous interface long contact times are required and the efficiency of this contact has been enhanced by utilising high surface area bubbles such as microbubble. However, what is good for mass transfer is also good for heat transfer and both usually go hand in hand with conventional gaseous and liquid contact processes. In fact in many situations it is expected that sensible heat transfer will prevail over mass transfer. Thus the present processes are problematic when seeking to avoid sensible heat transfer as in the case for example of the removal of volatile materials from heat sensitive mixtures. Such separations are either impossible or require very complicated and expensive separation protocols that may introduce other problems such as contamination.

DISCLOSURE OF THE INVENTION

The present invention is predicated on the finding that under certain conditions processes involving mass transfer do not behave as expected. It has been found that if microbubbles are used under certain conditions of contact with a liquid phase then highly effective mass transfer may occur between the gaseous and liquid phases with less than expected or little or no sensible heat transfer. The present invention in part provides a means by which the known state of a cold liquid of varying depths can be changed using a hot gas injected via a micro bubble inducing internal mixing without allowing the resultant mixture to reach equilibrium thereby ensuring the transfer process becomes continuous. The important finding is that contrary to convention the conditions result in mass transfer even though there is little or no sensible heat transfer. Conventional understanding is that both or neither would occur. This finding holds for contact of a hot gas with a cold liquid and for the contact of a cold gas with a hot liquid.

When considering heat transfer in a hot gas cold liquid system the heat ratio ($\alpha$) between the heat which is transferred as latent heat of vaporization, to the total sensible heat lost in the inlet gas is an important parameter. It is assumed that all the heat lost in inlet gas is either lost as sensible heat transfer to the liquid or as latent heat of vaporization. The following equations and approximations are useful in this context: Total heat loss ($Q_T$)=Host loss as latent heat ($Q_L$)+ Sensible heat transferred ($Q_S$). Then the following relationship applies.

$$\alpha = \frac{\text{Heat loss as latent heat } (Q_L)}{\text{Total heat loss } (Q_T)} = \frac{Q_T - Q_S}{Q_T}$$

In the context of the present invention it is an objective to keep the absolute value of $\alpha$ as high as possible (minimum sensible heat transfer) whilst ensuring some level of useful material transfer between the contacted phases.

Thus according to the present invention there is provided a mass transfer process involving contact of at least one gaseous phase with at least one liquid phase such that the heat ratio of the system $$\alpha = \frac{Q_T - Q_S}{Q_T}$$

is maintained at an a value of greater than 0.5, wherein the process comprises at least one gaseous phase comprising microbubbles being passed through a liquid phase of thickness no more than 10 cm to enable mass transfer between the phases.

Preferably the heat ratio of the system is greater than 0.6, preferably greater than 0.7, and most preferably greater than 0.9.

In preferred embodiments contact time is optimised through control of the thickness of liquid through which the microbubbles travel when in contact with the liquid phase during the process. It is preferred that this distance/thickness is no more than 100 times the mean diameter of the microbubbles used in the process. In practice this means that the thickness of the liquid phase is 10 cm or less, more preferably 5 cm or less, more preferably 4 cm or less, more preferably 3.5, cm or less, more preferably 3.0 cm or less, more preferably 2.5 cm or less, more preferably 2.0 cm or less, more preferably 1 cm or less and most preferably 0.5 cm or less. The minimum distance or thickness is at least 100 microns and more preferably at least 200 microns.

In the context of the present invention the term microbubble means bubbles of mean diameter of 2 mm or less, preferably 1.5 mm or less, preferably 1 mm or less and most preferably 0.5 mm or less. It is preferred that the mean diameter of the microbubbles is within the range of 0.03 to 2 mm, more preferably 0.03 to 1.5 mm, more preferably 0.05 to 1.5 mm, more preferably 0.05 to 1 mm and most preferably 0.05 to 0.5 mm.

Mass transfer may be any desirable level of mass transfer. The extent of mass transfer will depend on the nature of the gaseous phase in terms of its composition, the nature of the liquid phase in terms of its composition and the relative temperatures of both phases. In addition the extent of mass transfer in some circumstances will depend on other operating parameters such as the size and distribution of microbubbles and/or the flow rate of the gaseous phase into the liquid phase.

They key finding in respect of the present invention is that under these conditions when conventional bubbles are used there is either no sensible heat transfer and mass transfer or they both occur to a significant extent. If microbubbles are utilised with control of contact or residence time, mainly through distance traveled through the liquid phase, it has been surprisingly found that mass transfer prevails over sensible heat transfer. In these circumstances any level of mass transfer may be highly significant and of value in the absence of significant heat transfer.

Although low but meaningful levels of mass transfer are envisaged in the process of the present invention it has been surprisingly discovered that relatively high levels of mass transfer are attained; much higher than would be expected in the absence of significant sensible heat transfer and/or in the presence of larger bubbles in the process and/or extended contact or residence time. Thus when considering mass transfer to the gaseous phase from the liquid phase the levels of mass transfer are such that the % saturation levels of a given material in the gaseous phase may be of the order of 30% or more, 40% or more, 50% or more, 75% or more and most preferably 90% or more. When considering mass transfer to the liquid phase from the gaseous phase the levels of mass transfer are such that the % saturation levels of a given material in the gaseous phase may reduced to the order of 90% or less, 75% or less, 50% or less, 40% or less and most preferably 30% or less.

In the present invention the contact time will depend on the nature of the liquid phase e.g. viscosity and/or temperature etc and the nature of the gaseous phase e.g. density and/or temperature and/or microbubble size etc. Another important factor is the distance to be traveled by the microbubbles through the liquid phase. All of these parameters may be varied to provide the optimum material transfer, whilst minimising or avoiding sensible heat transfer. The residence contact time may be selected to achieve equilibrium for mass transfer, whilst maintaining non-equilibrium conditions in respect of sensible heat transfer. It is possible to select shorter residence times than required to achieve mass transfer equilibrium. However, residence contact times that are longer than that required to achieve mass transfer equilibrium have no advantage and may be counter productive as the longer the residence time the greater the possibility that the non-equilibrium sensible heat transfer conditions may not be maintained. It is also preferred that irrespective of the extent of mass transfer that the residence contact time is selected to ensure that non-equilibrium sensible heat transfer conditions are maintained throughout the residence contact time.

The process of the present invention may be utilised in a number of scenarios where mass transfer is desirable and limited or no thermal transfer is desired.

Thus in one embodiment the present invention provides a process for the mass transfer of at least one volatile component from a liquid phase of thickness D which is at a temperature $t_0$ below the temperature $t_1$ of volatilisation of the volatile component, through contact with a gaseous phase at a temperature $t_2$, which is above the volatilisation temperature $t_1$ of the volatile component and the heat ratio of the system $$\alpha = \frac{Q_T - Q_S}{Q_T}$$

is maintained at an $\alpha$ value of greater than 0.5, which process comprises contact of the gaseous phase in the form of microbubbles with control of liquid thickness D such that there is mass transfer of the volatile component into the gaseous phase after it has traversed distance D of the liquid phase.

In a further embodiment the present invention provides a process for the mass transfer of at least one volatile component in a gaseous phase at temperature $t_2$ into a liquid phase of thickness D at a temperature $t_0$ which is higher than the temperature $t_2$ of the gaseous phase and the heat ratio of the system $$\alpha = \frac{Q_T - Q_S}{Q_T}$$

is maintained at an $\alpha$ value of greater than 0.5, which process comprises contact of the gaseous phase in the form of microbubbles with control of liquid thickness D such that the volatile component dissolves into the liquid phase and after the gaseous phase has traversed distance D through the liquid phase.

In a further embodiment the process of the present invention is utilised to mediate a simple bi-molecular reaction, with limited or no sensible heat transfer between the liquid and gaseous phases. Thus the present invention further provides a process for the reaction of a component A with a component B to provide a product C, in which process component A is introduced to the reaction in or as a gaseous phase and component B is introduced to the reaction in or as a liquid phase, the liquid phase being at a temperature $t_0$, which is lower than the temperature $t_2$ of the gaseous phase, and having a thickness D, and the heat ratio of the system $$\alpha = \frac{Q_T - Q_S}{Q_T}$$

is maintained at an $\alpha$ value of greater than 0.5, wherein contact of the gaseous phase is in the form of microbubbles with control of liquid thickness D such that component A reacts with component B to provide a non-equilibrium concentration of A in the gaseous phase after it has traversed distance D through the liquid phase.

In this embodiment the product C may dissolve and accumulate in the liquid phase or if it is volatile it may be concentrated in the gaseous phase, where it may reach an equilibrium concentration after the gaseous phase has traversed distance D in the liquid. The reaction may occur in the gaseous phase or the liquid phase or may be a substantially interfacial reaction. In one embodiment there may be a by-product of the reaction, which may accumulate in the gaseous phase as it passes through thickness D of the liquid phase and it may be the removal of this by-product under conditions that drives the reaction of A and B to form C in the liquid phase with no heat transfer to the liquid. The reaction may be catalysed and a suitable catalyst may be introduced via the liquid or gaseous phases. As an example of this embodiment a liquid phase comprising an acid may be contacted with a hotter gaseous phase comprising an alcohol e.g. methanol, during contact the acid and methanol react under condensation reaction conditions to produce an ester, which dissolves in the liquid phase. At the same time the water produced through the condensation reaction is volatilised into the gaseous phase. There is little or no sensible heat transfer from the gaseous phase to the liquid phase. In an alternative embodiment the liquid phase may be at a higher temperature than the gaseous phase. In a further embodiment components A and B may be present in the liquid phase and a catalyst for their reaction may be introduced via the gaseous phase, with any byproducts and/or products being removed in the gaseous phase.

In one embodiment the components A and B with or without catalyst are in the liquid phase and the hot gaseous phase is used to remove a volatile by-product such as water to drive the reaction of A and B to completion without heat transfer to the liquid phase.

The processes of the present invention may find utility in a wide range of chemical reactions and processes where mass transfer between a gaseous and liquid phase may be used, whilst avoiding significant or any sensible heat transfer between these phases.

Such processes include the stripping of volatile components from simple or complex liquid compositions that may be heat sensitive or contain heat sensitive components or simply where it is desirable to avoid sensible heat transfer. Avoiding sensible heat transfer has the advantage of retaining heat within the gaseous phase for use in further downstream reactions of the gaseous component. Such an ability to control heat in this way may enable certain multistage processes that hitherto have not been possible or to make known multistage processes economic.

Such processes also include dissolution of components from gaseous streams without sensible heat transfer to the liquid phase and heat loss from the gaseous phase. This is highly desirable, when for example the dissolution is stripping a material such as for example a waste product or contaminant from a complex gaseous stream that may then be used at the retained temperature in further downstream reactions and processes.

Such processes also include scenarios where the gaseous phase is at a lower temperature and material condenses into this phase from a hotter liquid phase. Maintaining the temperature of either phase in such a process may enable the purification of complex mixtures that may only be purified if the mixture is at a high temperature; the lack of sensible heat transfer ensuring that the high temperature is maintained and condensation is driven in the gaseous phase.

In many biomass conversion processes there are problems in separation and recovery of intermediates and/or final products from the processed biomass, which often contains heat sensitive components or impurities. The process of the present invention may be adapted to upgrade processed biomass through the recovery of desirable products from the processed biomass or through the removal of impurities or reaction by-products. For example ethanol or methanol may be recovered from the processed biomass. In another example high levels of water may be removed thus enhancing the properties of the processed biomass, whilst preventing significant sensible heat transfer to the processed biomass liquid phase.

Pyrolysis oil is a promising biofuel and chemical source that suffers from low calorific value and instability problems. The presence of high amounts of water and oxygen containing compounds (e.g. diacids and dialcohols) in pyrolysis oil contributes significantly to these problems. Attempts to separate these compounds from pyrolysis oil particularly by traditional distillation have been hindered due to high sensible heat transferred to pyrolysis oil which promotes instability. The process of the present invention may be adapted to upgrade pyrolysis oil as one or more of the contaminants and water may be removed from the pyrolysis oil without significant sensible heat transfer to the pyrolysis oil.

Thus according to the present invention there is provided a mass transfer process involving contact of at least one gaseous phase with processed biomass in the liquid phase such that the heat ratio of the system $$\alpha = \frac{Q_T - Q_S}{Q_T}$$

is maintained at an α value of greater than 0.5, wherein the process comprises at least one gaseous phase comprising microbubbles being passed through the processed biomass in the liquid phase of thickness no more than 10 cm with mass transfer from the processed biomass liquid phase to the gaseous phase. In one embodiment the process facilitates the transfer of ethanol from the processed biomass phase into the gaseous phase. In a further embodiment the process facilitates the transfer of methanol from the processed biomass phase into the gaseous phase. In a further embodiment the process facilitates the transfer of one or more hydrocarbons from the processed biomass phase into the gaseous phase. In a further embodiment the process facilitates the transfer of water from the processed pyrolysis oil into the gaseous phase.

The present invention is also concerned with multi-stage mass transfer processes involving contact of a continuous horizontal and thin flow of a liquid over sequences of microbubble generating difusers with the microbubbles at different temperatures. In this scenario the arrangement would approximate staged distillation or fractionation or rectification depending on the compositions of the microbubble gases or gases used and the liquid and the relative temperatures selected. Rectification can be mimicked by increasing the microbubble temperature at each successive diffuser from the boiling point of the most volatile component to a temperature consistent with the higher boiling point fractions or desired higher boiling point fraction.

The present invention is also concerned with a mass transfer plant or apparatus, which comprises means for containing and maintaining a liquid phase over one or more diffusers, at a thickness of greater than 100 micron and less than 10 cm, means for introducing a gaseous phase in the form of microbubbles through the one or more diffusers arranged to ensure that the gaseous phase transverses the liquid phase, means for collecting the gaseous phase after it has traversed the liquid phase and means for collecting the liquid phase after the gaseous phase has transversed the liquid phase.

In addition there may be means as appropriate to isolate one or more materials from the collected liquid and/or gaseous phases after mass transfer. In addition there may be means to control the temperatures of the liquid and gaseous phases and means for controlling the flow of the liquid phase into the plant or apparatus and/or means for control the rate of flow of the gaseous phase into the plant or apparatus. In a preferred embodiment the plant or apparatus comprises a fluidic oscillator for introduction of the gaseous phase and preferably a fluidic oscillator as described in WO2008/053174.

The crucial factor in the present invention is the selection of microbubbles as the form for introduction of the gaseous phase to the process and in addition ensuring that the distance traveled by these microbubbles through the liquid phase is controlled.

The key principle here is for injection of a cloud of microbubbles into a liquid, wherein thermally induced non-equilibrium driving forces are maintained for a controllable contacting time. It is possible therefore to control the contacting time for rising microbubble clouds so that non-equilibrium transfer processes can be preferentially selected for transfer effects to and from the microbubble.

For any average bubble cloud rise velocity, the contact time of the two phases can be set by the depth of the layer of liquid. The implication of the contact time being controllable by depth of the layer of liquid is the ability to select preferentially which non-equilibrium effect is dominant for the overall inter phase transfer.

For any given system there will be a demonstrable contacting time during which the microbubble has the optimum vapour content, as, in the competition between heat transfer to a liquid and evaporation, the evaporation is initially faster. In the case of a system where water is being evaporated after this contact time sensible heat transfer will lead to condensation of the previously evaporated water vapour.

The state of the microbubble vapour phase can be quenched at any contacting time by design—selection of the layer height and then a rapid vapour extraction from the header space.

The finding is that both processes are inherently transient, but that during short residence times, mass transfer is favoured, while at longer residence times, sensible heat transfer dominates and results in re-condensation of the liquid. This maximum mass transfer layer thickness is estimated in some systems to be a few hundred microns and of the order of a few microbubble diameters at most. If the maximum mass transfer estimate and the contact time necessary to achieve it are accurately estimated, these are engineering design features needed to design a mass transfer system to achieve maximum removal of material with minimum sensible heat transfer.

In the context of the present invention selection of the appropriate bubbles namely microbubbles and the appropriate microbubble source and method of production is important.

With microbubbles generally a larger overall surface area allows the bubbles to drag more liquid as they ascend. Consequently, the momentum transfer brought about by a cloud of tiny bubbles is higher than that obtained from a collection of larger bubbles of same volume. In addition to having a higher drag force in liquid, tiny bubbles also have significantly higher residence time in liquid than coarse bubbles. In theory, this feature can be observed by considering Stokes law for a smooth sphere rising at its terminal velocity in a Newtonian fluid.

$$U_{stokes} = \frac{2g(\rho_l - \rho_g)r^2}{9\mu_l}$$

Where $U_{stokes}$ is the spheres terminal velocity, g is the gravitational acceleration, r is the bubble radius, and $\mu L$ is the liquid dynamic viscosity, $\rho_L$ and $\rho_g$ the liquid and gas phase density respectively. From stokes law, it can be observed that the rise velocity is proportional to a square of the bubble radius. Therefore, small bubbles will rise less quickly than larger bubbles in liquid, causing them to have a much higher residence time.

Heat and mass transfer rates by microbubbles is enhanced due to their high surface area to volume ratio. The concentration profile surrounding microbubbles in a liquid differs from large bubbles because they have a higher internal pressure which enhances the convection of liquid towards the bubble centre.

In principle any suitable source of microbubbles may be used in the process of the present invention.

Many known microbubble cloud generation systems have global liquid mixing that is highly turbulent, which very rapidly equilibrates bubbles, and the generation mechanism often makes the bubble from the vapour of the liquid hence thermal and chemical equilibrium exist from the outset. In certain embodiments of the present invention this may be advantageous. In one embodiment where a volatile component of a liquid mixture is being removed through contact with gaseous microbubbles at a temperature above the volatisation temperature of the component to be removed it has been found that the temperature of the liquid phase actually decreases during the contact when such microbubbles are used. These types of microbubbles are typically produced without the use of a fluidic oscillation.

In other embodiments of the present invention it is preferred that the source of microbubbles produces microbubbles that traverse the thickness of the liquid phase without inducing turbulent mixing. It is also preferred that the source of microbubbles is such that the microbubble clouds produced in the liquid phase are substantially monodisperse. By substantially monodisperse is meant a cloud of microbubbles with at least 90% of the bubbles of the same radius. It is also preferred that the source of microbubbles is such that it produces a laminar flow of bubbles through the liquid phase. In this embodiment it is preferred that the microbubbles are prepared in accordance with the apparatus and methods as described in published international patent application no. WO2008/053174, the whole contents of which are hereby incorporated by reference.

In published international patent application no. WO2008/053174, the microbubble generation device utilises a fluidic oscillator. This fluidic oscillation method may be used to generate micro-bubbles of sizes as low as 20 μm in diameter. The fluidic oscillator has been successful in minimizing bubble size increase by using a pulsating flow of air at high frequency to control the growth of bubbles. The device in this patent had a set of nozzle banks with apertures 600 μm in diameter and this device was successful in the formation of nearly monodispersed, well distributed bubbles, with majority below 1 mm in size. The diffuser used typically had 20 μm size pores. Thus with fluidic oscillation, nearly mono-disperse and non-coalescent bubbles tuneable between 20-100 μm are produced. Without fluidic oscillation bubbles are larger in size (about 500 μm) due the formation of bubbles significantly larger than the pores and from bubble coalescence. The fluidic oscillator is very advantageous because it is easy to manufacture, relatively inexpensive, has low energy requirements and no moving parts. In particular, the low energy requirement of the fluidic oscillator approach is a major advantage when compared to conventional microbubble generation (e.g. flotation methods), which are typically more energy intensive.

It is possible to inject a microbubble cloud with nearly uniform spacing of the bubbles and narrow size distribution, where the bubbles are largely non-coalescent and the multiphase flow has very little energy density.

BRIEF DESCRIPTION OF THE DRAWINGS

A present invention is exemplified and will be better understood upon reference to the following non-limiting examples in conjunction with the accompanying drawings in which.

EXAMPLES

Figure 1:
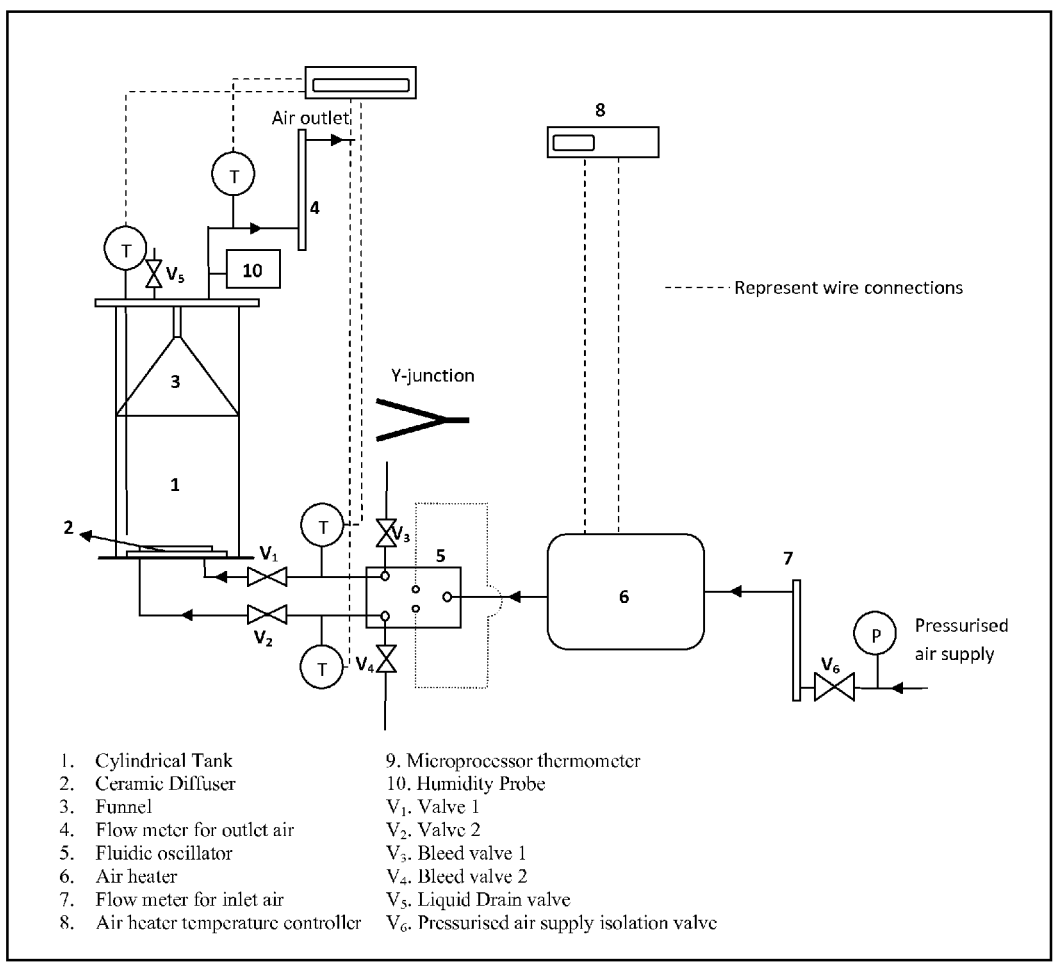
FIG. 1 is a schematic of the apparatus of the present invention as used in the examples.

The main apparatus and general conditions used for the experiments include: a cylindrical tank, a micro-porous ceramic diffuser, a fluidic oscillator, an air heater and a temperature controller (for air—heater). A description of these apparatus is provided as follows.

A cylindrical tank with a 14 cm internal diameter and 34 cm height was used for the experiments. The tank is constructed from Perspex (PMMA); a transparent material which allows monitoring of bubble behavior within the tank. A funnel is present at the upper area of the tank to help direct rising vapour to the gas outlet tube of the cylinder and to help reduce vapour condensation. The tank is rested on an aluminium base with three vertical support stands. The top of the cylindrical tank was covered with a Perspex lid and sealed with silicon adhesive. A micro-porous ceramic diffuser is fitted at the bottom of the tank for use in bubble generation. The diffuser together with the tank constitutes a bubble column.

The diffuser used in this study is manufactured by HP technical ceramics limited, Sheffield. The ceramic used in constructing the diffuser is composed mainly of Alumina and fused silica. The diffuser has two gas stream inlets with diameters 6 mm. It has an internal and external diameter of 10.2 cm and 11.2 cm respectively and pore diameters of 20 μm. The internal area of the diffuser is 78.5 cm$^2$ and its pore number density is 10000 pores/cm$^2$.

An electric heater with a power rating of 1.5 kW was used to raise the temperature of inlet gas to the desired value for experiments. A 25 m heating coil is contained within the heater. The temperature of the heater is controlled by a temperature controller. When connected to an electricity supply, the controller displays a set point temperature for the heater which can be varied depending on the required air inlet temperature to the diffuser.

A fluidic oscillator as generally described in international patent application no. WO2008/053174 was used in generating the microbubbles used in some experiments. The principles underlying the operation of a fluidic oscillator has already been described earlier in this specification. A fluidic oscillator constructed from aluminium was used instead since aluminium is a better thermal conductor and can withstand the high temperatures that would be used during the experiments. The fluidic oscillator has a feedback loop 1 m in length connecting the two control terminals. The output and supply terminal have diameters of 6 mm, while the control terminal has a diameter of 5 mm.

A Precision gold N18FR temperature and humidity probe meter was used in measuring the relative humidity of air streams. The probe is introduced in the pathway of an air flow to measure its relative humidity.

Air flow meters (i.e. rotameters) were used to measure the flow rate of air entering and leaving the system. A flowmeter having a flow range of 30-150 Lmin$^{-1}$ was used to measure the inlet-air flow rate in all experiments. The flowmeter used to measure outlet air flow was either of two types depending on the magnitude of the outlet flow which varied from 1 Lmin$^{-1}$ to 50 Lmin$^{-1}$ between experiments. A flowmeter with a flow range of 100-1200 cm$^3$ min$^{-1}$ was used for measuring low outlet flow rates. For higher outlet flow rates, a flowmeter with a range of 6-50 Lmin$^{-1}$ was used instead.

A total of five thermocouples have been used for the experiments. They were all K-type thermocouples (Ni Cr$^+$/ Ni Al$^-$). The thermocouples were connected to a Comark Model 6400 Microprocessor Thermometer which displays the temperature reading from the thermocouples. The microprocessor thermometer serves as a temperature monitor and it has a knob for switching between temperature readings from different thermocouples.

A digital stopwatch timer was used to record time during experiments.

The chemical concentration of methanol-water solutions were estimated using gas chromatography (GC) equipped with a thermal conductivity detector (TCD). Gas chromatography was chosen as the analysis method because it has a good sensitivity to volatile organics. A Varian 3900 reverse phase gas chromatography system equipped with a 2 m Hayesep P column was used. The column was pressurised using compressed nitrogen gas at 10 psi and the column oven temperature was held at 140° C. The TCD detector and injector were at 180° C. and 150° C., respectively. After each run, the GC equipment estimates the percentage peak area of methanol and water in a sample.

Equipment Set-Up

The equipments were set up in two different configurations depending on whether or not a fluidic oscillator is present.

Set Up with Fluidic Oscillator

A schematic of the set up is shown in FIG. 1. The system is fed with pressurised air from a main air supply. The air passes through a flowmeter to measure its flow rate before being sent to the air heater to raise its temperature. After passing through the heater, the air flows into the supply terminal of the fluidic oscillator after which the air flow is divided between the bleed valves and the inlet pipes to the diffuser. The bleed valves are present to remove excess air that is not required at the diffuser inlet. The inlet air that is not bled off passes through to the inlet ports of the diffuser into the cylindrical tank where bubbles are formed in a presence of a liquid.

The inlet air temperature is measured at the pipe connection between the fluidic oscillator and the bubble column by two thermocouples having their sensor inserted into the middle section of the two inlet pipes. A thermocouple with its sensor located near the bottom of the bubble column was used in measuring the liquid temperature in the tank. A further thermocouple was located in the outlet air pipe for measuring the outlet air temperature.

Valves ($V_1$ and $V_2$) were used to prevent the flow back of liquid into fluidic oscillator when the system is not in operation. $V_1$ and $V_2$ were also useful for controlling the gas flow into the cylindrical tank. The pipes connecting the heater, fluidic oscillator and bubble column are 6 mm in diameter and made from copper. Copper was used so that the pipes can withstand high temperatures used in the experiments. The drain valve ($V_5$) is used to remove liquid from the cylindrical tank by employing a siphon effect.

Set Up without Fluidic Oscillator

The apparatus set up without fluidic oscillator is very similar to that with the fluidic oscillator. The main difference is that the fluidic oscillator was replaced with a Y-Junction as illustrated in FIG. 1.

Materials

The pressurised air used in the experiments was obtained from a main air supply pipe present in the laboratory. The pressure of the air supply could be read from a pressure gauge located on the supply pipe line. The flow rate of the air supply is controlled by an isolation valve ($V_6$) before entry into the equipment. The relative humidity of the air supply was measured using the humidity probe and observed to be zero percent.

Methanol and water were selected to make up a binary mixture for investigating microbubble mediated distillation. Methanol-water mixtures can be readily separated by normal batch distillation since the relative volatility between methanol and water is greater than one and the mixture does not suffer from complexities such as azeotrope formation. The methanol (Chromasoly®, for HPLC, 99.9%) used in this work was purchased from Sigma-Aldrich, UK.

Tap water was used in all experiments except those involving methanol-water mixtures. High purity deionised water of resistivity 18.2 MΩ·cm was used in making up mixtures of methanol-water because a relatively high purity level of the mixtures was considered important for chromatographic measurements. The deionised water has been filtered through a Millipak express 20 filter unit-0.22 μm (Cat no. MPGP02001)

Experimental Methods

Figure 2:
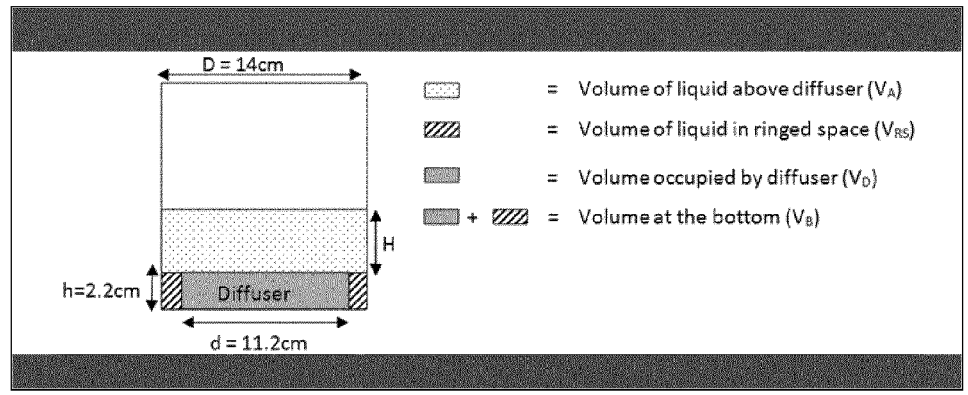
FIG. 2 is a simple schematic of the bubble column.

The liquid height or level being considered in the experiments is that which is above the diffuser. The following approach was used to calculate the approximate volume of water required for different liquid levels. Consider a simple schematic of the bubble column as shown in FIG. 2. The following relations can be deduced from FIG. 2:

$$V_B = \frac{\pi D^2 h}{4} = \frac{\pi \times 0.14^2 \times 0.022 \times 1000}{4} = 0.339 \text{ Litres}$$

-continued $$V_D = \frac{\pi d^2 h}{4} = \frac{\pi \times 0.112^2 \times 0.022 \times 1000}{4} = 0.217 \text{ Litres}$$

$$V_{RS} = V_B - V_D = 0.339 - 0.217 = 0.122 \text{ Litres}$$

$$V_A = \frac{\pi \times 0.14^2 \times H \times 1000}{4} = 15.39H \text{(in litres)}$$

Volume required for any given liquid height $H =$ $$V_A + V_{RS} = 15.39H + 0.122$$

For example, the volume for a liquid height of 8 cm is: Volume of liquid required for 8 cm height=(15.39×0.08)+ 0.122=1.35 liters In the above calculations, it has been assumed that the diffuser is non porous hence it does not store water in its pores. This assumption is considered reasonable for such minute pore sizes. In addition only the outer diameter of the diffuser has been used in calculating the volume of diffuser. Knowing that the diffuser has an inner diameter of 10 cm, it can be inferred that the volumes of liquid estimated for a given height is slightly lower than the true volume required.

Example 1

Preliminary experiments were performed to study the effect of operating variables (air flow rate, liquid level and evaporation time) on evaporation rate from a single component liquid i.e. water. The results from preliminary experiments show that decreasing liquid level provides higher evaporation rates and lower sensible heat transfer compared to changing other operating variables.

Procedure for Example 1

Equipment set-up with the fluidic oscillator was used for experiments in this Example. The procedure for each experimental run is as follows:

Pressurised air supply valve ($V_6$) was open to allow the desired air inlet flow rate into the system. The bleed valves were completely closed (i.e. no fluidic oscillation) while valves $V_1$ and $V_2$ were completely open. Due to fluctuations in the flow rate of the main air supply, the air flow through the system (indicated by the outlet flow meter) was continually monitored and adjusted when necessary to maintain it at the desired value throughout the experiment. Power supply to the temperature controller and microprocessor thermometer was turned on. The column was filled with a small amount of water for heating purposes i.e. to minimise temperature rise within the tank. The temperature controller was given a set point of 250° C. to allow rapid heating of the inlet air stream. Thereafter, the temperature of the inlet air to diffuser was monitored until it reached approximately 135° C. After the desired inlet air temperature was attained, the set point of the temperature controller was frequently adjusted between 210° C. and 235° C. (depending on the air flow rate) to maintain the inlet air temperature within 135° C.±5 (i.e. average value between two inlets) for the duration of the experiment. High controller set point temperatures were used to allow for heat losses in the pipe connection to the diffuser. When the desired air temperature was attained, the bubble column was emptied by siphon action. This was achieved by closing the end of the air outlet pipe with finger tip, so that the water in the tank is forced out through the drain valve ($V_5$) into a pipe whose other end is inserted in a beaker below the level of liquid in tank. Some tap water was collected in a beaker and the water temperature adjusted to 20° C.±0.2. The water temperature was measured using a fifth thermocouple also connected to the microprocessor thermometer. The required volume of water (e.g. 1.35 L for 8 cm height) was transferred from the beaker into a measuring cylinder. The measured volume of water was then poured into the tank through a funnel. Immediately after filling the tank, the stop watch timer was started and readings of inlet air temperatures, outlet air temperature and water temperature were recorded. These readings were again recorded every 5 minutes for the duration of the experiment.

At the end of each experimental run, the remaining water in the cylindrical tank was emptied into a measuring cylinder. The volume of the remaining water in the tank was then measured and subtracted from the initial volume in the tank to get the amount of liquid evaporated. The above procedure was repeated for all experimental runs.

Results from Example 1

The amount evaporated during each experimental run was used to estimate the percentage evaporation by applying the following equation.

$$\text{Percentage Evaporation } (\%) = \frac{\text{Amount evaporated}}{\text{Initial volume}} = \frac{V_0 - V}{V_0} \times 100\%$$

Where:
$V_0$=Initial volume of liquid in tank (ml).
$V$=Final volume of liquid after evaporation (ml)

TABLE 1

| Run no | Inlet air flow rate (L/min) | Level of water (cm) | Time for evaporation (min) | Amount Evaporated (ml) | % Evaporation |
|---|---|---|---|---|---|
| 1 | 35 ± 2 | 4 | 70 | 95 ± 5 | 12.8 |
| 2 | 45 ± 2 | 4 | 70 | 125 ± 5 | 16.9 |
| 3 | 35 ± 2 | 10 | 70 | 80 ± 5 | 4.8 |
| 4 | 45 ± 2 | 10 | 70 | 105 ± 5 | 6.3 |
| 5 | 35 ± 2 | 4 | 130 | 172 ± 5 | 23.2 |
| 6 | 45 ± 2 | 4 | 130 | 240 ± 5 | 32.4 |
| 7 | 35 ± 2 | 10 | 130 | 165 ± 5 | 9.9 |
| 8 | 45 ± 2 | 10 | 130 | 225 ± 5 | 13.6 |
| 9 | 30 ± 2 | 8 | 100 | 110 ± 5 | 8.1 |
| 10 | 50 ± 2 | 8 | 100 | 210 ± 5 | 15.6 |
| 11 | 40 ± 2 | 2 | 100 | 170 ± 5 | 39.5 |
| 12 | 40 ± 2 | 12 | 100 | 151 ± 5 | 7.7 |
| 13 | 40 ± 2 | 8 | 40 | 52 ± 5 | 3.9 |
| 14 | 40 ± 2 | 8 | 160 | 263 ± 5 | 19.5 |
| 15 | 40 ± 2 | 8 | 100 | 152 ± 5 | 11.3 |
| 16 | 40 ± 2 | 8 | 100 | 150 ± 5 | 11.1 |
| 17 | 40 ± 2 | 8 | 100 | 152 ± 5 | 11.3 |
| 18 | 40 ± 2 | 8 | 100 | 152 ± 5 | 11.3 |
| 19 | 40 ± 2 | 8 | 100 | 160 ± 5 | 11.9 |
| 20 | 40 ± 2 | 8 | 100 | 155 ± 5 | 11.5 |
| 21 | 40 ± 2 | 4 | 100 | 160 ± 5 | 21.6 |

Table 1 summarises the main results from Example 1. It is worth noting that the relative humidity of the outlet air from all experimental runs was 100%.

The mean and standard deviation of percentage evaporation from replicated experimental runs (i.e. Run 15 to 20) has been calculated using Microsoft Excel and found to be 11.4% and 0.276, respectively. This standard deviation may be assumed for experimental runs which have not been replicated.

Effect of Water Level on Evaporation Rate

Figure 3:
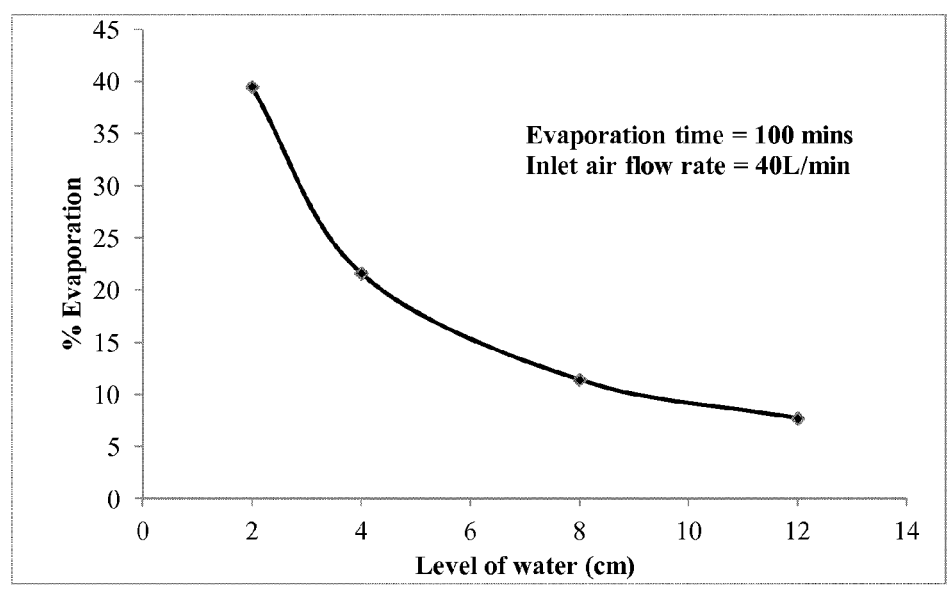
FIG. 3 is a plot of percentage evaporation versus water level for Example 1.

Table 2 presents the results for percentage evaporation at different water levels. In these experiments, the air flow rate and evaporation time were kept the same. This data is also represented in FIG. 3. From FIG. 3 it is observed that percentage evaporation increases with decrease in water level.

TABLE 2

| Run no | Inlet air flow rate (L/min) | Level of water (cm) | Time for evaporation (min) | % Evaporation |
|---|---|---|---|---|
| 11 | 40 | 2 | 100 | 39.5 |
| 21 | 40 | 4 | 100 | 21.6 |
| 15-20 | 40 | 8 | 100 | 11.4 (Mean) |
| 12 | 40 | 12 | 100 | 7.7 |

Figure 4:
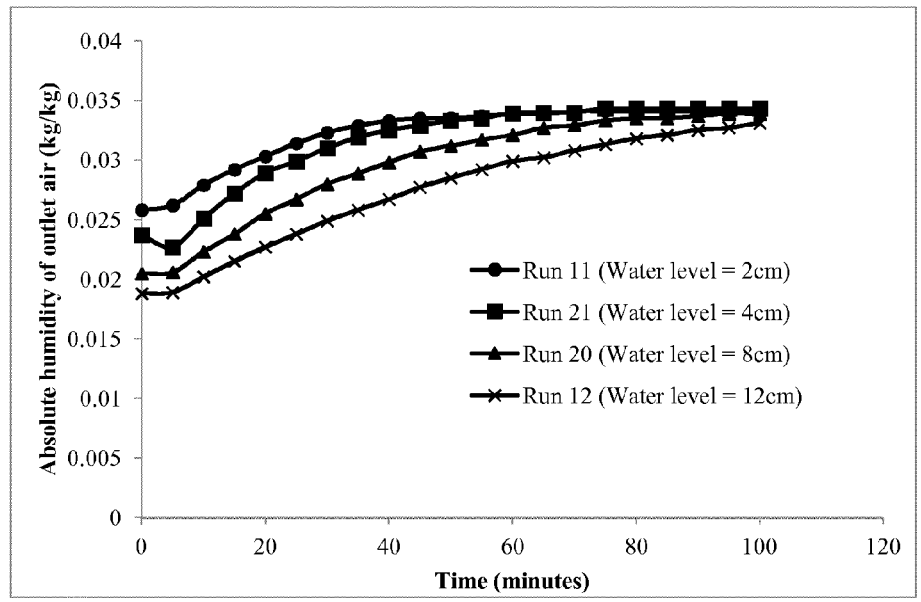
FIG. 4 is a plot of outlet air humidity versus time for different liquid levels for Example 1.

As noted earlier, observing the trend of outlet air humidity at different liquid levels should also provide an indication of variation of evaporation rate with liquid level. FIG. 4 plots outlet air humidity against time for different liquid levels. The air flow rate and evaporation time was kept at 40 L/min and 100 minutes, respectively, for all conditions plotted. FIG. 4 shows that the humidity of outlet air increases with time for all liquid levels until an approximate steady value is attained. The magnitude of outlet humidity is mostly higher at lower levels especially before the attainment of a near steady humidity value. This indicates that the evaporation rate is higher at lower liquid levels.

Example 2

The purpose of this example was to investigate microbubble mediated distillation using a binary mixture of methanol and water.

Different experimental runs have been performed using methanol-water mixture. In each run, a 50 vol % methanol-water solution was poured into the cylindrical tank. After passing hot air bubbles through the solution over a period of time, the final volume of the solution in the tank was measured. Samples of the remaining solutions in the tank were collected and analysed using gas chromatography to determine the liquid concentration. Liquid level was varied between experimental runs to observe any effects on final concentration of remaining mixture. For comparison purposes, some experiments were performed with fluidic oscillation and others without fluidic oscillation.

Preparation of Methanol-Water Solutions

Mixtures of methanol and water were prepared via a measured volume of methanol poured into a cylinder containing an equal volume of deionised water to obtain a 50 vol % solution. After mixing, the temperature of the mixture rose indicating an exothermic interaction between methanol and water. The volume of the mixture also contracted by about 4% upon mixing. To reduce the temperature of solution down to 20° C. which is the reference temperature used for the experiments, the cylinder was inserted into a large beaker containing water at a lower temperature. A reduction in the temperature of solution was achieved by the transfer of heat from the solution to the surrounding water in the beaker. After achieving a temperature of 20° C.±0.2, the beaker containing the mixture was then placed on a magnetic stirrer for better mixing of the solution.

Operating Conditions for Example 2

The operating conditions for the Example 2 are presented in Table 3 and 4. A low flow-rate of 1 Lmin$^{-1}$ was chosen to allow the formation of smaller bubbles compared to previous experiments. For all experimental runs, the initial mixture temperature was kept within 20° C.±0.2. The inlet air temperature to the diffuser in all tests was controlled to be within 90° C.±2. This value for air temperature was chosen because it is above the boiling point of methanol (65° C.) and below that of water (100° C.), hence it is expected that the bubbles generates at 90° C. will preferentially evaporate more of methanol than water.

amount of liquid evaporated. A small amount of the remaining solution was stored in tightly sealed and labeled 15 ml centrifuge tubes as sample for gas chromatography measurements. The samples were stored in a fridge to minimise evaporation. After each test the tank was then rinsed with a small amount of water before the start of the next run.

TABLE 3

| Test no | Height of 50 vol % methanol mixture (cm) | Vol of water(ml) | Flow rate of inlet air to Y-junction (L/min) | Flow rate of inlet air to diffuser (L/min) | Temp of inlet air to diffuser (° C.) | Evaporation time (mins) |
| --- | --- | --- | --- | --- | --- | --- |
| 1 | 0.5 | 200 ± 5 | 100 ± 2 | 1 ± 0.1 | 90 ± 2 | 200 |
| 2 | 2 | 430 ± 5 | 100 ± 2 | 1 ± 0.1 | 90 ± 2 | 200 |
| 3 | 4 | 738 ± 5 | 100 ± 2 | 1 ± 0.1 | 90 ± 2 | 200 |

Table 3 operating conditions for binary liquid experiments without fluidic oscillation.

TABLE 4

| Test no | Height of 50 vol % methanol mixture (cm) | Volume of water(ml) | Flow rate of inlet air to oscillator (L/min) | Flow rate of inlet air to diffuser (L/min) | Temperature of inlet air to diffuser (° C.) | Evaporation time(mins) |
| --- | --- | --- | --- | --- | --- | --- |
| 4 | 0.5 | 200 ± 5 | 80 ± 2 | 1 ± 0.1 | 90 ± 2 | 200 |
| 5 | 2 | 430 ± 5 | 80 ± 2 | 1 ± 0.1 | 90 ± 2 | 200 |
| 6 | 4 | 738 ± 5 | 80 ± 2 | 1 ± 0.1 | 90 ± 2 | 200 |

Table 4: Operating conditions for binary liquid experiments with fluidic oscillation.

Procedure for Example 2

At the start of each experiment, the air inlet flow to heater was set to the desired value after which the bleed valve or valves were open just enough to remove excess air not required at diffuser inlet. When fluidic oscillation is required, the bleed valves must be adjusted until the oscillation frequency of the air in the fluidic oscillator is within its resonance range (indicated by a continuous vibrating sound) whilst ensuring the outlet flow rate is 1 L/min. The temperature controller was given a set point of about 150° C. before the tank was filled with a small amount of water for heating purposes. The temperature of the inlet air to diffuser was monitored until it reached around 90° C. After achieving the required air inlet temperature, the set point of the temperature controller was frequently adjusted to maintain the inlet air within the required temperature range of 90° C.±2 throughout the experiment. The tank was then emptied and the required volume of methanol-water mixture at 20° C.±0.2 was measured and poured into the cylindrical tank through a funnel. Immediately after filling the tank, the stopwatch was started and readings of inlet air temperatures, air outlet temperature and mixture temperature were recorded. These readings were recorded every 10 minutes for the duration of the experiment. At the end of each experimental run, the remaining solution in the tank was emptied into the measuring cylinder. The tank was emptied by using a syringe to create additional suction because a low air flow rate was used in these experiments. The volume of the remaining water in the tank was then measured and subtracted from the initial volume in the tank to get the Results from Example 2

Effect of Liquid Level and Fluidic Oscillation on Final Methanol Concentrations

Table 5 presents results from Experiment 2. An inlet air flow rate of IL/min, evaporation time of 100 minutes and an average inlet air temperature of 90° C. has been used for all Tests.

TABLE 5

| Test no | Level of mixture (cm) | Fluidic Oscillation | Amount evaporated (ml) | Peak area of methanol (%) | Concentration of methanol in remaining mixture (vol %) |
| --- | --- | --- | --- | --- | --- |
| 1 | 0.5 | No | 30 ± 5 | 20.96 | 37.42 |
| 2 | 2 | No | 30 ± 5 | 22.15 | 39.52 |
| 3 | 4 | No | 26 ± 5 | 23.64 | 42.15 |
| 4 | 0.5 | Yes | 36 ± 5 | 20.72 | 37.00 |
| 5 | 2 | Yes | 28 ± 5 | 23.13 | 41.25 |
| 6 | 4 | Yes | 36 ± 5 | 24.32 | 43.34 |

Figure 5:
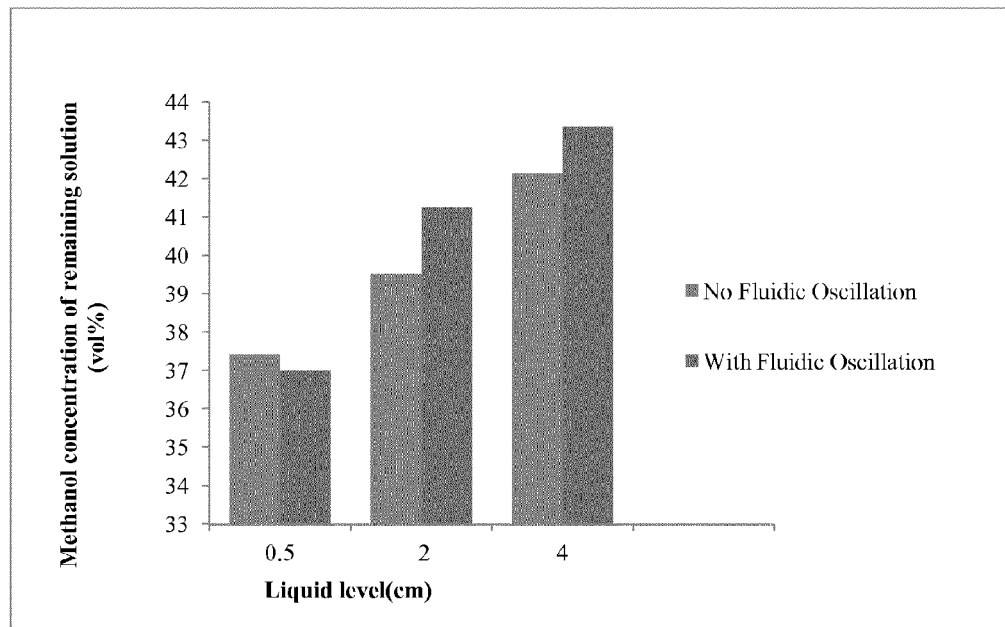
FIG. 5 is a plot of methanol concentration in remaining mixtures versus liquid level for Example 2.

FIG. 5 is a plot of the final methanol concentration in mixtures versus liquid level. It is observed that the final concentration of methanol is lower at low liquid levels compared to higher liquid levels. This indicates that separation is improved as liquid level decreases. The final concentration of methanol from tests performed with fluidic oscillation is slightly higher than those performed without fluidic oscillation for liquid levels of 2 and 4 cm, suggesting that less of methanol has been evaporated with fluidic oscillation at these levels. However at a liquid level of 0.5 cm, the methanol concentration obtained with fluidic oscillation is slightly lower than that obtained without fluidic oscillation suggesting that more of methanol has been evaporated with fluidic oscillation.

Figure 6:
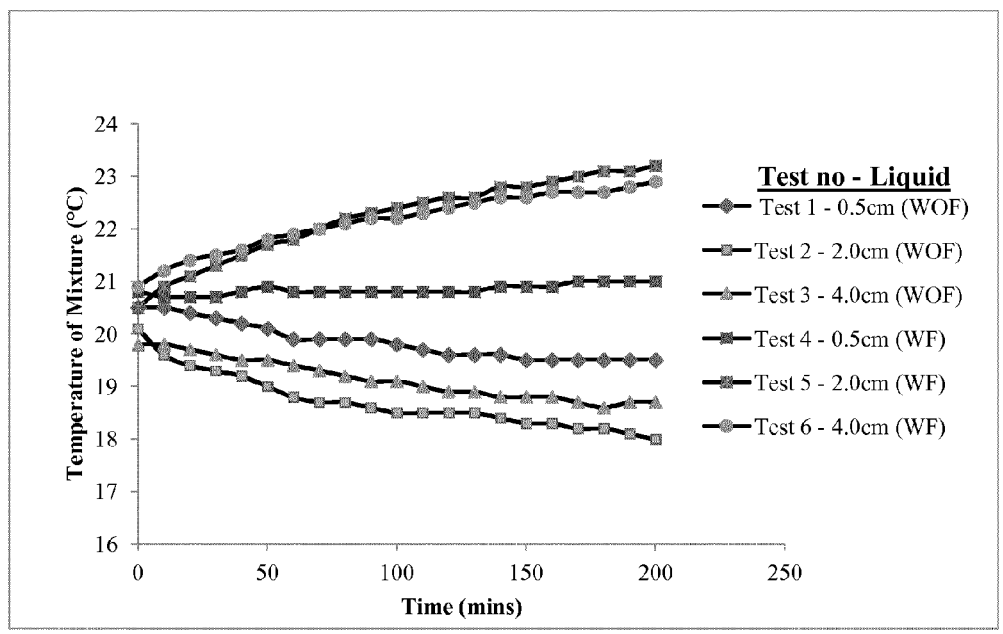
FIG. 6 is a plot of temperature of mixture against time for different liquid levels for Example 2.

Data for mixture temperature against time for Tests 1 to 6 is plotted in FIG. 6 showing the effect of liquid level and fluidic oscillation on temperature of binary mixtures. In FIG. 6, WF represents tests performed with fluidic oscillation while WOF represents tests performed without fluidic oscillation. A decrease in mixture temperature with time was observed in all tests performed without fluidic oscillation. In contrary, an increase in mixture temperature was observe in all test performed with fluidic oscillation, although the temperature increase was less significant at the lowest liquid level used i.e. 0.5 cm.

Determining the Ratio Between Latent Heat and Sensible Heat Lost in Inlet Air

The data from this example was used to estimate the heat ratio ($\alpha$) between the heat which is transferred as latent heat of vaporisation, to the total sensible heat lost in the inlet air. It is assumed that all the heat lost in inlet air is either loss as sensible heat to mixture or as latent heat of vaporization. The following equations and approximations have been used:

Sensible heat loss in inlet air ($Q_T$)=Heat loss as latent heat ($Q_L$)+ Sensible heat transferred to mixture ($Q_S$)

$$\alpha = \frac{\text{Heat loss as latent heat } (Q_L)}{\text{Sensible heat lost in inlet air } (Q_T)} = \frac{Q_T - Q_S}{Q_T}$$

Specific heat at constant pressure of methanol mixtures is taken as 0.917 cal/g° C. (3851.4 J/kg·K). This specific heat was obtained from Perry, R. H. and Green, D. W. (2008). *Perry's Chemical Engineers' Handbook*. 8$^{th}$ ed. New York: McGraw-Hill. p 14-88, 2-183, 2-176, 14-16, 2-116, for a 27.3 mol % aqueous methanol at 20° C. Specific heat at constant pressure of air is taken as 1010 J/kg·K.

The pressure of the air stream is taken as 1.513 bar for an air flow rate of 3 L/min. Furthermore, it is assumed that density and volume of methanol-water mixture remains constant during each experimental run.

$$Q_T = \dot{m}_{air} C_{p,air}(T_{i,air} - T_{o,air})t = \dot{n} M W_{air} C_{p,air}(T_{i,air} - T_{o,air})t$$

$$Q_S = m_{mix} C_{p,mix}(T_{o,mix} - T_{i,mix}) = \rho V_{mix} C_{p,mix}(T_{o,mix} - T_{i,mix})$$

Where:
Subscript 'air' and 'mix' represents air and mixture, respectively.
m=mass (kg)
$\dot{m}$=mass flow rate (kg/min)
$C_p$=Specific heat in J/kg·K
$T_i$=Initial/inlet temperature
$T_o$=Final/outlet temperature
t=Time for evaporation (minutes)
$\dot{n}$=molar flow rate of air stream. Assuming ideal gas law holds, $$\dot{n} = \frac{P\dot{V}}{RT}$$

R=Ideal gas constant=8314 J/kmol·K
ρ=Density is 50 vol % (44 wt %) methanol-water mixture=0.9272 g/ml (Perry & Green, 2008, p 2-116).
For better clarity, the parameters that have been used for calculations in this section are given in the table below.

| Parameter | Value |
| --- | --- |
| Pressure of inlet air | 1.513 bar (151,300 Pa) |
| Specific heat of methanol mixture | 3851.4 J/kg · K |
| Specific heat of air | 1010 J/kg · K |
| Density of 50 vol % methanol-water mixture | 0.9272 g/ml |
| Air flow rate | 1 L/min = 0.001 m³/min |
| Time for evaporation | 200 minutes |
| Air inlet temperature | 363K (90° C.) |
| Molecular weight of air | 28.96 kg/kmol (Perry & Green, 2008, p2-176) |

The heat lost by air stream and sensible heat transferred to mixture was calculated for Test 4, 5 and 6 only as these were the only tests during which the mixture temperature increases with time. An example calculation is given below for Test 4. Liquid volume used in Test 4 is 200 ml. Average outlet air temperature ($T_{o,air}$) and final liquid temperature ($T_{o,mix}$) from Test 4 was 25.26° C. and 21° C. The initial mixture temperature was taken as 20° C., which is the temperature of the mixture before it was poured into the bubble column.

Heat Lost in Inlet Air $$(Q_T) = \frac{P\dot{V}}{RT} MW_{air} C_{p,air}(T_{i,air} - T_{o,air})t$$

$$= \frac{151,300 \text{ Pa} \times 0.001 \text{ m}^3/\text{min}}{8314 \text{ J/kmol.K} \times 363} \times 28.96 \text{ kg/kmol} \times 1010 \text{ J/kg.K} \times$$

$$(363 - 298.26)\text{K} \times 200 \text{ min}$$

$$= 18.99 \text{ kJ}$$

Sensible Heat Transferred to Mixture $$(Q_s) = \rho V_{mix} C_{p,mix}(T_{o,mix} - T_{i,mix}) =$$

$$0.9272 \text{ g/ml} \times 200 \text{ ml} \times 3851.4 \text{ J/kg.K} \times (21 - 20) \times 10^{-3} = 0.714 \text{ kJ}$$

$$\alpha = \frac{Q_T - Q_S}{Q_T} = \frac{18.99 \text{ kJ} - 0.714}{18.99 \text{ kJ}}$$

$$= 0.962$$

$$= 96.2\%$$

Therefore an estimated 96.2% of the sensible heat lost in inlet air is transferred as latent heat while the remaining 3.8% is transferred as sensible heat.

The above calculations were repeated for Test 5 and 6, and the result are given in Table 6.

TABLE 6

| Test no | Liquid level (cm) | $Q_T$ (kJ) | $Q_S$ (kJ) | $\alpha$ (kJ) |
| --- | --- | --- | --- | --- |
| 4 | 0.5 | 18.99 | 0.714 | 0.962 |
| 5 | 2.0 | 19.60 | 4.914 | 0.749 |
| 6 | 4.0 | 19.19 | 7.643 | 0.602 |

The results from binary distillation experiments of Example 2 show that microbubbles can indeed achieve appreciable liquid separation with minimal sensible heat transfer. Separation efficiency was improved with decreasing liquid level. Highest separation efficiency was observed in experiments performed using the lowest liquid level (i.e.

0.5 cm) combined with fluidic oscillation, where the methanol concentration reduced from an initial value of 50 vol % to a final value of 37 vol %. This was achieved with a low liquid temperature rise of 0.2° C. Fluidic oscillation was observed to reduce separation efficiency and increase liquid temperature rise at high liquid levels (2 cm and 4 cm) but at a lower liquid level (0.5 cm) fluidic oscillation slightly improved separation efficiency with negligible liquid temperature rise. Therefore, if a fluidic oscillator is to be employed, it should be limited to low liquid levels to allow higher separation efficiencies and to limit temperature rise.

Assessment of the Data.

Not wishing to be bound by any theory it is believed that the following observations provide further insight into the data obtained in the Examples.

Assessment Example 1

FIGS. 3 and 4 effectively demonstrate that upon decreasing water level, evaporation rate is increased. The conditions plotted are for an air flow rate of 40 L/min. At such a high air flow rate, the bubbles formed (considering the absence of fluidic oscillation) should be relatively large, perhaps a few mm in size. Nevertheless, the size distribution of the bubbles formed in each experiment should be similar since the same air flow rate has been used. It is believed that after the bubbles are formed, they rise through the liquid and transfer latent heat to the surrounding fluid hence initiating the evaporation of liquid around the 'skin' of the bubbles. As the bubbles rise, maximum evaporation will occur at very low liquid levels after which the vapour will begin to lose heat and condense back into the liquid until it equilibrates. It is believed that there exists a critical height or residence time at which maximum re-condensation will occur. Before that critical height is achieved, the amount of condensation will increase as liquid level increases. Therefore, the amount of vapour that is not condensed hence vaporised increases as the liquid level is decreased. It is believed that for this reason, evaporation rate is observed to increase with decreasing level, which is counterintuitive.

Enhancing evaporation rate by decreasing liquid layer is a favourable option when considering the objective of the present invention since the augmentation in liquid temperature upon decreasing the water layer is not as significant at that observed from increasing air flow rate. Moreover, decreasing liquid layer from 12 cm to 2 cm increases percentage evaporation by 413% (see FIG. 3) which is huge amount when compared to a mere increase of 92.6% achieved when air flow rate was increased from 30 L/min to 50 L/min.

Increasing the gas flow rate can result in increased cost associated with evaporation, especially if an expensive gas is to be employed. Moreover, the energy required to heat the gas phase to the desired temperature will increase as the flow rate increases which will also incur additional cost. Whereas, decreasing liquid level may add little if any additional cost to the operation of the system. Furthermore, if a high gas flow rate is to be employed, it may necessitate the use of larger equipment which will increase capital cost. The safety of the procedure will also be affected when using high gas flow rates especially because the gas flow would be at a very high temperature and pressure. Therefore, it is highly favourable to improve evaporation rate by decreasing liquid level rather than increasing gas flow rate. This counterintuitive outcome from these experiments is highly significant.

Assessment Example 2

As indicated above, if the residence time of microbubbles is too high in a liquid, the evaporated vapour will lose heat to its surroundings and re-condense until it equilibrates with the liquid phase. Microbubbles will normally rise slowly in liquid compared to large bubbles as a consequence of Stokes law as discussed above. Although this behavior is seen as an advantage in many applications (especially in mass transfer), it constitutes a problem in the present invention since the goal is to achieve short residence time in the liquid layer to prevent sensible heat transfer and vapour re-condensation. As observed from FIG. 6, the increase in methanol concentration of remaining mixtures on moving from low to high liquid levels (for conditions with and without fluidic oscillation) indicates that methanol separation is reduced as liquid level increases, which is counterintuitive. It is believed that this behavior is most likely due to an increase in re-condensation of methanol vapour caused by an increase in residence time of bubbles in the liquid phase.

The diameter of microbubbles generated by fluidic oscillation is expected to be smaller than those generated without fluidic oscillation using the same gas inlet flow rate. It is believed that as they are smaller in size, microbubbles generated by fluidic oscillation are expected to give higher separation of methanol from a 'thin' liquid layer when compared to those generated without fluidic oscillation. It is believed that this is because small microbubbles will exhibit higher internal mixing rates compared to larger microbubbles. The results demonstrate that fluidic oscillation helps improve separation efficiency at low liquid levels (e.g. 0.5 cm) but the opposite effect occurs at higher liquid levels. It is believed that the tendency for fluidic oscillation to reduce separation at high liquid levels may be attributed to the idea that the microbubbles generated by fluidic oscillation are smaller in comparison to those generated without fluidic oscillation; hence their residence time in liquid will be higher. Even though fluidic oscillator generated microbubbles may provide maximum evaporation from a thin layer, for a thick liquid layer they would have greater chance of sensible heat transfer and vapour re-condensation than microbubbles generated without fluidic oscillation. At lower liquid levels (i.e. 0.5 cm), the liquid layer is gradually approaching conditions of being 'thin', hence a slight increase in separation efficiency by fluidic oscillation is observed. The highest separation of methanol was also observed in Test 4, which was performed using a low liquid level of 0.5 cm combined with fluidic oscillation. In Test 4 methanol concentration was decreased from 50 vol % to 37 vol %. These observations show the surprising results obtained with microbubbles obtained via fluidic oscillation passing through thin liquid layers.

In FIG. 6, the increase in mixture temperatures observed in experiments performed with fluidic oscillation can be explained by considering that smaller microbubbles have a higher residence time in the liquid layer. Therefore, more time is available for the transfer of sensible heat to the mixture.

It FIG. 6 it is believed that the decrease in mixture temperature observed in tests performed without fluidic oscillation can be attributed to concept of microbubble evaporative cooling. Evaporative cooling is a phenomenon that occurs when a liquid evaporates into a moving air stream with the latent heat for vaporisation taken from the surrounding liquid. Consequently, the surrounding liquid remains in its liquid state but at a lower temperature. As the microbubbles generated without fluidic oscillation are larger than those generated with fluidic oscillator, their residence time in the liquid is less. It is believed that this lower residence time could mean that the bubbles can transfer a higher fraction of the mixture into the vapour phase, with the latent heat taken from the liquid phase.

From FIG. 6 it is observed that the temperature of mixtures in all Tests does not change substantial from their initial value, with a maximum temperature rise of 2.7° C. observed in Test 5 which was performed without fluidic oscillation and with a liquid level of 2 cm. The mixture temperature in Test 4 was increased by 0.2° C. only. This indicates that good separation can be achieved with minimal sensible heat transfer since the highest separation of methanol was also observed in Test 4.

Figure 7:
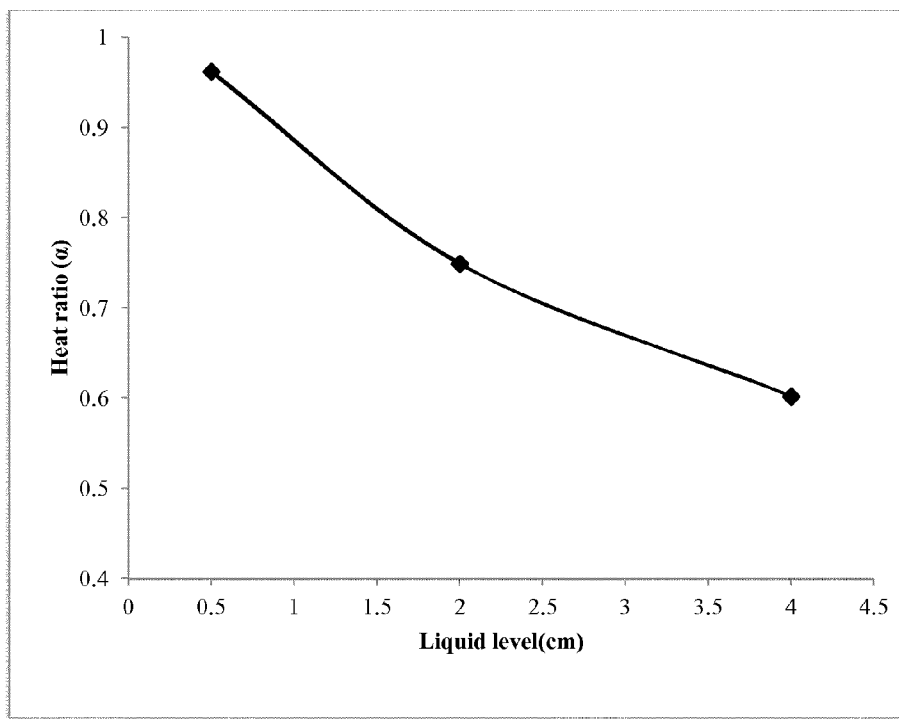
FIG. 7 is a plot of heat ratio (a) against liquid level for Example 2.

The heat ratios ($\alpha$) between latent heat and sensible heat lost in inlet air for Test 4, 5 and 6 have been calculated. The results plotted in FIG. 7 show that the fraction of heat lost in inlet air which is transferred as latent heat goes up as liquid level decreases. Therefore maximum latent heat and minimum sensible heat transfer is expected to occur at very low liquid levels approximating to a 'thin' liquid layer. Consequently, separation efficiency would increase as liquid level decreases especially when microbubbles are introduced at a temperature higher than the boiling point of the most volatile component (e.g. methanol) and less than that of the least volatile component (e.g. water). This is the behavior observed in FIG. 7, which shows an increase in methanol separation with decreasing liquid level.

Thus the Examples show that in microbubble mediated batch distillation experiments microbubbles can offer appreciable liquid separation with little or no liquid temperature rise. Decreasing the liquid level used in distillation enhances separation which is counterintuitive. Maximum separation of methanol was observed in experiments performed using the lowest liquid level (i.e. 0.5 cm) combined with fluidic oscillation, where the methanol concentration decreased from an initial value of 50 vol % to a final value of 37 vol %. This was achieved with a low liquid temperature rise of 0.2° C., which at this scale is an insignificant amount of sensible heat transfer to the liquid phase. In microbubble batch distillation experiments, fluidic oscillation was observed to reduce separation efficiency and increase liquid temperature rise at high liquid levels (i.e. 2 cm and 4 cm).

At lower liquid levels (i.e. 0.5 cm) fluidic oscillation slightly improved separation efficiency with minimal liquid temperature rise. Therefore if fluidic oscillation is involved, it is best used at low liquid levels to allow better separation and limit temperature rise. Furthermore, microbubble induced evaporative cooling of the liquid phase with time was observed in experiments performed without fluidic oscillation and gas at elevated temperature, which is considered advantageous for separation of thermal sensitive liquids.

Example 3

In a further experiment, hot bone-dry air at a temperature around 145° C. was made to flow upwards through a micro porous diffuser into a cylindrical tank (i.e. bubble column) containing some water at room temperature, over a period of 250 minutes. The water temperature rose from 21.5° C. to 27.6° C. over 250 minutes of evaporation, while about 34 ml of liquid had evaporated. Surprisingly, the relative humidity of the outlet air was 100% for the duration of the experiment. As an attempt to achieve less than saturation relative humidity of the outlet air, they performed further experiments using lower liquid levels in the bubble column. Upon decreasing the liquid height, the outlet air remained at saturation relative humidity throughout the experiments. However, an increase in the absolute humidity of the outlet air was observed, while the water temperature did not increase as much.

This behavior signified that there exists a competition between the sensible heat transferred to liquid and the latent heat used in vaporisation. Bearing in mind that an increase in absolute humidity of outlet air indicates more evaporation, their results suggest that upon decreasing the liquid layer height (i.e. reducing residence time of microbubbles in liquid), evaporation starts to dominate over sensible heat transfer.

Example 4

A further series of experiments were undertaken as follows with liquid heights of 0.5 cm or less and utilsing water/ethanol mixtures. The experimental apparatus was as previously described. Pure ethanol was used (99.7%) and was mixed with deionised water in a 50:50 volume ratio for the water/ethanol experiments.

Deionised Water Experiments at 0.5 cm or Less

All of the experiments were carried out under the same operating conditions of inlet airflow rate and temperature (1±0.1 L/min & 135±2 00). Table 7 presents the overall experiments that were performed on deionised water including the operating conditions and the rate of evaporation.

TABLE 7

| Exp. no. | Fluidic oscillation | Inlet air flow rate(L/min) | Average inlet air Temp.(C.) | Water Level (cm) | Average water Temp.(° C.) | Time of evaporation (min) | % Evaporation |
|---|---|---|---|---|---|---|---|
| 1 | No | 1 ± 0.1 | 135.8 | 0.1 | 19.6 | 100 | 3.93 |
| 2 | No | 1 ± 0.1 | 136.5 | 0.2 | 21.3 | 100 | 3.025 |
| 3 | No | 1 ± 0.1 | 136.9 | 0.3 | 20.5 | 100 | 2.62 |
| 4 | No | 1 ± 0.1 | 136 | 0.4 | 20.1 | 100 | 2.4 |
| 5 | No | 1 ± 0.1 | 136.4 | 0.5 | 21.5 | 100 | 1.6 |
| 6 | Yes | 1 ± 0.1 | 136.4 | 0.1 | 23 | 100 | 28.7 |
| 7 | Yes | 1 ± 0.1 | 136 | 0.2 | 23.1 | 100 | 17.94 |
| 8 | Yes | 1 ± 0.1 | 136.5 | 0.3 | 21.9 | 100 | 11.8 |
| 9 | Yes | 1 ± 0.1 | 136.9 | 0.4 | 21 | 100 | 4.5 |
| 10 | Yes | 1 ± 0.1 | 136.5 | 0.5 | 20.5 | 100 | 4.7 |

Table 7: Summary of the experimental results of evaporating deionised water with and without using fluidic oscillation.

Figure 8:
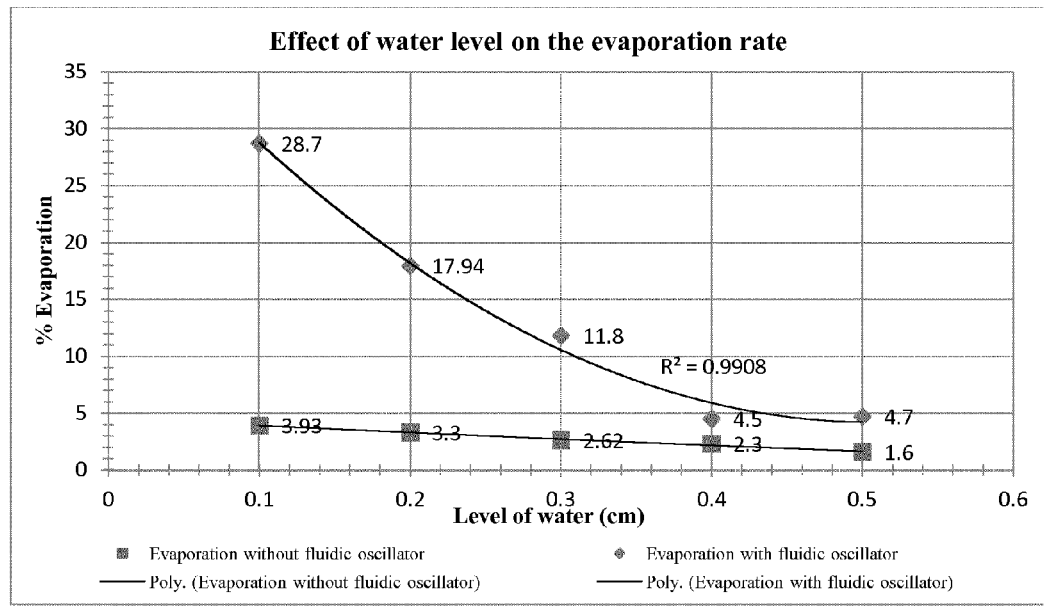
FIG. 8 is a plot of percentage evaporation versus water level for Example 4 deionised water.

As mentioned in the previous experiments, the level of water has a considerable effect on the evaporation percentage over the other parameters (e.g. inlet air temperature and flow rate). FIG. 8 presents the results highlighted in Table 7 as percentage of evaporation vs. water level.

Ethanol/Deionised Water Experiments at 0.5 cm or Less

These experiments were carried out on standard mixtures of ethanol-water at a volume ratio of (50:50) and at the same operating conditions of inlet airflow rate and temperature of (1±0.1 L/min & 100±2° C.) respectively. Table 8 presents the overall experimental results with and without using fluidic oscillation.

TABLE 8

| Experiment no. | Inlet air flow rate (L/min) | Mixture Level (cm) | Average mixture Temperature (° C.) | Time of evaporation (min) | % Evaporation |
|---|---|---|---|---|---|
| 1- Without oscillator | 1 ± 0.1 | 0.1 | 22.27 | 100 | 36.3 |
| 2- Without oscillator | 1 ± 0.1 | 0.2 | 19.75 | 100 | 14.83 |
| 3- Without oscillator | 1 ± 0.1 | 0.3 | 20.4 | 100 | 7.5 |
| 4- Without oscillator | 1 ± 0.1 | 0.4 | 19.98 | 100 | 6.37 |
| 5- Without oscillator | 1 ± 0.1 | 0.5 | 19.19 | 100 | 3.4 |
| 6- With oscillator | 1 ± 0.1 | 0.1 | 22.43 | 100 | 43.15 |
| 7- With oscillator | 1 ± 0.1 | 0.2 | 20.86 | 100 | 19.24 |
| 8- With oscillator | 1 ± 0.1 | 0.3 | 20.08 | 100 | 13.2 |
| 9- With oscillator | 1 ± 0.1 | 0.4 | 19.91 | 100 | 9.5 |
| 10- With oscillator | 1 ± 0.1 | 0.5 | 19.85 | 100 | 7.5 |

Table 8: Summary of the experimental results of evaporating ethanol/deionised water with and without using fluidic oscillation.

Figure 9:
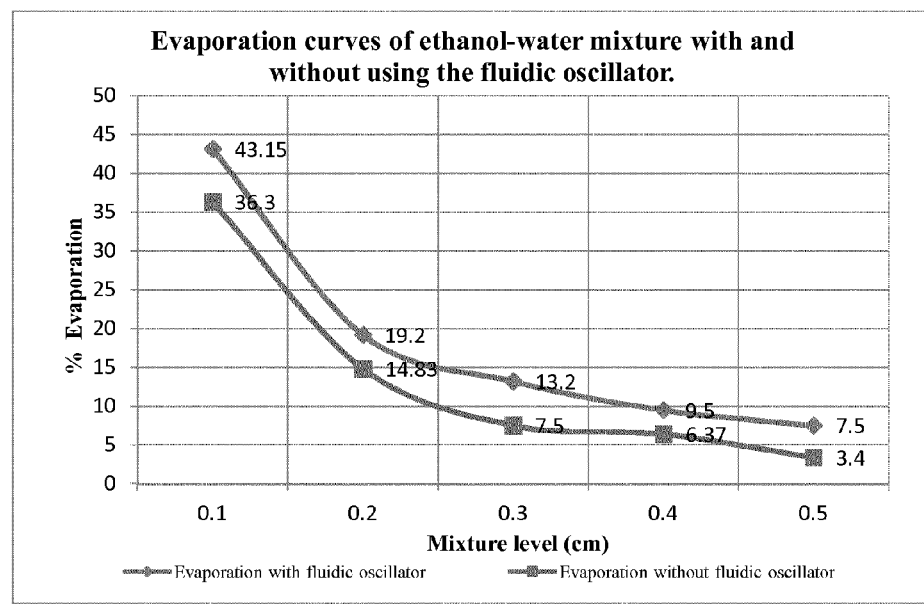
FIG. 9 is a plot of percentage evaporation versus liquid level for Example 4 deionised water/ethanol mixtures.

These experiments show that decreasing the level of the mixture caused a significant increase in the percentage of evaporation. The same phenomenon as has been observed in the single liquid evaporation system of deionised water. FIG. 9 illustrates the effect of mixture level on the percentage of evaporation of binary mixture of ethanol and water.

Observations on Water and Ethanol/Water at 0.5 cm Liquid Height.

According to Table 7 and FIG. 8 decreasing the level from (0.5 cm to 0.1 cm) has resulted in an increase in the percentage of evaporation from 1.6% to 3.93% without use of the fluidic oscillator. However, when the fluidic oscillator is used the percentage evaporation increases from 4.7% to 28.7% under the same liquid levels and conditions. This means that the percentage of evaporation achieved at 0.1 cm with the fluidic oscillator is 7.3 times greater than that without use of the fluidic oscillator. For a liquid height of 0.5 cm, the ratio is only 2.94 times greater than that without the fluidic oscillator. These ratios demonstrate the high efficiency of the microbubbles produced by the fluidic oscillator over that of microbubbles produced without the fluidic oscillator. They also demonstrate a remarkable increase in efficiency with decrease of liquid level when used in combination with microbubbles.

According to Table 8 and FIG. 9 the same general trend and hypothesis was obtained in the evaporating ethanol/water binary mixtures. The liquid level has significant effects on the evaporation percentage of the mixture, for example decreasing the level from 0.5 cm to 0.1 cm resulted an increase in the percentage of evaporation from 7.5% to 43.15% for ethanol water mixture by using the fluidic oscillator.

The ratio between the results obtained with oscillator to that without the oscillator are not as great as those seen with the deionised water experiments. There may be technical reasons for this difference associated with the design of the apparatus and the relative efficiency of the ceramic diffuser used in the experiments. This diffuser produced microbubbles having an approximate diameter in the range of 800-900 μm without using the fluidic oscillator. The estimated bubble size produced by the same diffuser with the aid of the fluidic oscillator is about 300-500 μm or less according to the operating conditions. Furthermore as illustrated in FIG. 9 ethanol is evaporating very fast because of its high volatility and thus it would be expected to have a high percentage of evaporation with and without the fluidic oscillator.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise. Features, integers, characteristics, compounds described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A mass transfer process involving contact of at least one gaseous phase with at least one liquid phase such that a heat ratio ($\alpha$) of a system in which $Q_T$ is total heat loss and $Q_S$ is sensible heat transferred $$\alpha = \frac{Q_T - Q_S}{Q_T}$$

is maintained at a value of greater than 0.5, wherein the process comprises the at least one gaseous phase comprising microbubbles being passed through a liquid phase of thickness no more than 10 cm to enable mass transfer between the phases and wherein a resident contact time between the gaseous phase and liquid phase is selected to ensure that thermal non-equilibrium sensible heat transfer conditions are maintained throughout the residence contact time.

2. A process according to claim 1, wherein the heat ratio is maintained at a value of greater than 0.6.

3. A process according to claim 1, wherein the heat ratio is maintained at a value of greater than 0.7.

4. A process according to claim 1, wherein the heat ratio is maintained at a value of greater than 0.9.

5. A process according to claim 1, wherein the liquid phase thickness is no more than 5 cm.

6. A process according to claim 1, wherein the liquid phase thickness is no more than 4 cm.

7. A process according to claim 1, wherein the liquid phase thickness is no more than 3.5 cm.

8. A process according to claim 1, wherein the liquid phase thickness is no more than 3.0 cm.

9. A process according to claim 1, wherein the liquid phase thickness is no more than 2.5 cm.

10. A process according to claim 1, wherein the liquid phase thickness is no more than 2.0 cm.

11. A process according to claim 1, wherein the liquid phase thickness is no more than 1.0 cm.

12. A process according to claim 1, wherein the liquid phase thickness is no more than 0.5 cm.

13. A process according to claim 4, wherein the liquid phase thickness is at least 100 microns and no more than 10 cm.

14. A process according to claim 1, wherein the microbubbles have a mean diameter of 2 mm or less.

15. A process according to claim 1, wherein the microbubbles have a mean diameter of 1.5 mm or less.

16. A process according to claim 1, wherein the microbubbles have a mean diameter of preferably 1 mm or less.

17. A process according to claim 1, wherein the microbubbles have a mean diameter of 0.5 mm or less.

18. A process according to claim 1, wherein the microbubbles have a mean diameter within the range of 0.03 to 2 mm.

19. A process according to claim 1, wherein the microbubbles have a mean diameter within the range of 0.03 to 1.5 mm.

20. A process according to claim 1, wherein the microbubbles have a mean diameter within the range of 0.05 to 1.5 mm.

21. A process according to claim 1, wherein the microbubbles have a mean diameter within the range of 0.05 to 1 mm.

22. A process according to claim 1, wherein the microbubbles have a mean diameter within the range of 0.05 to 0.5 mm.

23. A mass transfer process as claimed in claim 1, wherein the microbubbles are provided to produce laminar flow of bubbles through the liquid phase.

24. A mass transfer process involving contact of at least one gaseous phase with processed biomass in the liquid phase such that a heat ratio ($\alpha$) of a system in which $Q_T$ is total heat loss and $Q_S$ is sensible heat transferred $$\alpha = \frac{Q_T - Q_S}{Q_T}$$

is maintained at a value of greater than 0.5, wherein the process comprises the at least one gaseous phase comprising microbubbles being passed through the processed biomass in the liquid phase of thickness no more than 10 cm with mass transfer from the processed biomass liquid phase to the gaseous phase and wherein a resident contact time between the gaseous phase and liquid phase is selected to ensure that thermal non-equilibrium sensible heat transfer conditions are maintained throughout the residence contact time.

25. A mass transfer process as claimed in claim 24, wherein the microbubbles are provided to produce laminar flow of bubbles through the liquid phase.

\* \* \* \* \*